United States Patent
Mukai

(10) Patent No.: US 7,631,974 B2
(45) Date of Patent: Dec. 15, 2009

(54) IMAGE DISPLAY METHOD AND IMAGE DISPLAY DEVICE

(75) Inventor: Kazuo Mukai, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/439,291

(22) PCT Filed: Aug. 28, 2007

(86) PCT No.: PCT/JP2007/066628

§ 371 (c)(1),
(2), (4) Date: Feb. 27, 2009

(87) PCT Pub. No.: WO2008/026576

PCT Pub. Date: Mar. 6, 2008

(65) Prior Publication Data

US 2009/0256974 A1    Oct. 15, 2009

(30) Foreign Application Priority Data

Aug. 29, 2006    (JP) ............................. 2006-231732

(51) Int. Cl.
G09G 5/10 (2006.01)
G03B 21/14 (2006.01)
(52) U.S. Cl. ................... 353/85; 345/589; 345/690; 353/122; 353/121
(58) Field of Classification Search ............. 353/69, 353/85, 121, 122; 345/589, 630
See application file for complete search history.

(56) References Cited

U.S. PATENT DOCUMENTS

| 6,847,374 B2 * | 1/2005 | Matsuda | 345/589 |
| 6,927,784 B2 * | 8/2005 | Matsuda et al. | 345/690 |
| 7,011,413 B2 * | 3/2006 | Wada | 353/31 |
| 7,220,006 B2 * | 5/2007 | Allen et al. | 353/85 |
| 7,221,374 B2 * | 5/2007 | Dixon | 345/591 |
| 7,345,692 B2 * | 3/2008 | Wada | 345/600 |

(Continued)

FOREIGN PATENT DOCUMENTS

JP    2002-094791 A    3/2002

(Continued)

*Primary Examiner*—William C Dowling
(74) *Attorney, Agent, or Firm*—Hamre, Schumann, Mueller & Larson, P.C.

(57) ABSTRACT

Difference values that are defined as values representing a magnitude of an influence exerted upon an illuminance of an ambient environment according to a brightness component of an input video signal and are set so as to correspond to the brightness component based on a result of measuring the magnitude of the influence previously, a plurality of illuminance ranges set by dividing an extent of the illuminance of the ambient environment, and brightness correction characteristic data for correcting the brightness component according to each of the illuminance ranges are stored. The brightness component is detected, so that the difference values are selected based on the detected value (S101), an illuminance sensor measures the illuminance of the ambient environment repeatedly (S102), one of the illuminance ranges is selected based on illuminance detection values obtained by previous and current measurements and the selected difference values (S103), and the brightness correction characteristic data according to the selected illuminance range is selected, so that the brightness component of the input video signal is corrected (S104). By reflecting the influence of reflected light from a screen due to image projection based on the input video signal, the brightness can be corrected stably according to a change in the brightness of the use environment.

10 Claims, 10 Drawing Sheets

U.S. PATENT DOCUMENTS

| | | |
|---|---|---|
| 7,545,397 B2 * | 6/2009 | O'Dea et al. .................. 345/694 |
| 7,575,330 B2 * | 8/2009 | Allen et al. ..................... 353/85 |
| 2002/0122048 A1 | 9/2002 | Kanai |
| 2003/0234785 A1 * | 12/2003 | Matsuda et al. .............. 345/426 |
| 2004/0196303 A1 * | 10/2004 | Matsuda ....................... 345/690 |
| 2008/0024514 A1 * | 1/2008 | Matsuda ....................... 345/589 |

FOREIGN PATENT DOCUMENTS

| | | |
|---|---|---|
| JP | 2002-202771 A | 7/2002 |
| JP | 3719498 | 9/2005 |
| JP | 2005-300639 A | 10/2005 |
| JP | 2006-135887 A | 5/2006 |

* cited by examiner

IMAGE DISPLAY METHOD AND IMAGE DISPLAY DEVICE

TECHNICAL FIELD

The present invention relates to an image display method and an image display device for displaying an output image stably with high visibility even when the brightness of an ambient environment is changed.

BACKGROUND ART

Conventionally, when image display devices such as a projector are used, an image processing method capable of achieving appropriate color reproduction is employed in order to adapt to a change in the brightness of external illumination as one kind of changes in the use environment, as disclosed in Patent Document 1, for example. More specifically, a brightness value of reflected light from a screen due to the external illumination is measured using an optical sensor, and a video signal is subjected to brightness correction/color correction, so that appropriate color reproduction can be achieved.
Patent Document 1: Japanese Patent No. 3719498

DISCLOSURE OF INVENTION

Problem to be Solved by the Invention

However, although the method disclosed in Patent Document 1 has no problem in correcting a static display such as a presentation on a personal computer, the following problem arises when the brightness of an input video signal is changed continuously like a moving image video signal.

More specifically, when the reflected light from the screen is changed in accordance with the continuously changing brightness of the input video signal, it is difficult to determine whether the change in the reflected light is caused by the change in the external illumination or the change in the input video signal for performing appropriate brightness correction/color correction. This results in a phenomenon of unstable correction. In particular, when the brightness is changed under a relatively dark environment of indirect illumination as in the case of using recent household projectors, the input video signal has a significant influence upon the reflected light from the screen, and thus brightness correction/color correction needs to be performed with consideration given to the above problem.

In view of the above-described problem, an object of the present invention is to provide an image display method and an image display device for performing stable brightness correction according to a change in the brightness of a use environment by reflecting an influence of reflected light from a screen due to image projection based on an input video signal.

Means for Solving Problem

An image display method according to the present invention is a method for displaying an image by using an image display device configured to modulate incident light with a spatial optical modulating element according to an input video signal so as to project an image onto a screen via a projection lens.

In order to solve the above-described problem, difference values, a plurality of illuminance ranges, and brightness correction characteristic data are used. The difference values are defined as values representing a magnitude of an influence exerted by the image display based on the input video signal upon an illuminance of an ambient environment according to a brightness component of the input video signal and are set so as to correspond to the brightness component based on a result of measuring the magnitude of the influence previously, the illuminance ranges are set by dividing an extent of the illuminance of the ambient environment, and the brightness correction characteristic data are prepared for changing the brightness component of the input video signal according to each of the illuminance ranges.

The method includes the steps of: detecting the brightness component of the input video signal so as to select the difference values based on the detected value; measuring the illuminance of the ambient environment repeatedly at regular time intervals by using an illuminance sensor; selecting one of the plurality of illuminance ranges based on illuminance detection values obtained by previous and current measurements and the selected difference values; selecting the brightness correction characteristic data according to the selected illuminance range so as to correct the brightness component of the input video signal based on the brightness correction characteristic data; and projecting an image based on the input video signal.

An image display device according to the present invention is configured to modulate incident light with a spatial optical modulating element according to an input video signal so as to project an image onto a screen via a projection lens.

In order to solve the above-described problem, the device includes: a brightness component detecting portion for detecting a brightness component of the input video signal; an illuminance sensor for measuring an illuminance of an ambient environment; a brightness correction characteristic memory for storing brightness correction characteristic data for correcting the brightness component of the input video signal; a brightness correction portion for correcting the brightness component of the input video signal based on the brightness correction characteristic data supplied from the brightness correction characteristic memory; an image projecting portion for projecting an image based on the corrected input video signal; and a control portion that is supplied with output signals from the brightness component detecting portion and the illuminance sensor, and stores difference values and a plurality of illuminance ranges, where the difference values are defined as values representing a magnitude of an influence exerted by the image display based on the input video signal upon the illuminance of the ambient environment according to the brightness component of the input video signal and are set so as to correspond to the brightness component based on a result of measuring the magnitude of the influence previously, and the illuminance ranges are set by dividing an extent of the illuminance of the ambient environment.

The illuminance sensor performs the measurement repeatedly at regular time intervals, and the control portion selects one of the plurality of illuminance ranges based on illuminance detection values obtained by previous and current measurements and the selected difference values, selects the brightness correction characteristic data according to the selected illuminance range from the brightness correction characteristic memory, and supplies the selected brightness correction characteristic data to the brightness correction portion.

Effects of the Invention

According to the present invention, a brightness component of an input video signal is detected, and an influence of reflected light from a screen due to a projected image is reflected, whereby the brightness can be corrected stably according to a change in the brightness of a use environment even when the brightness of the input video signal is changed continuously like a moving image video signal.

EXPLANATION OF LETTERS OR NUMERALS

Figure 1:
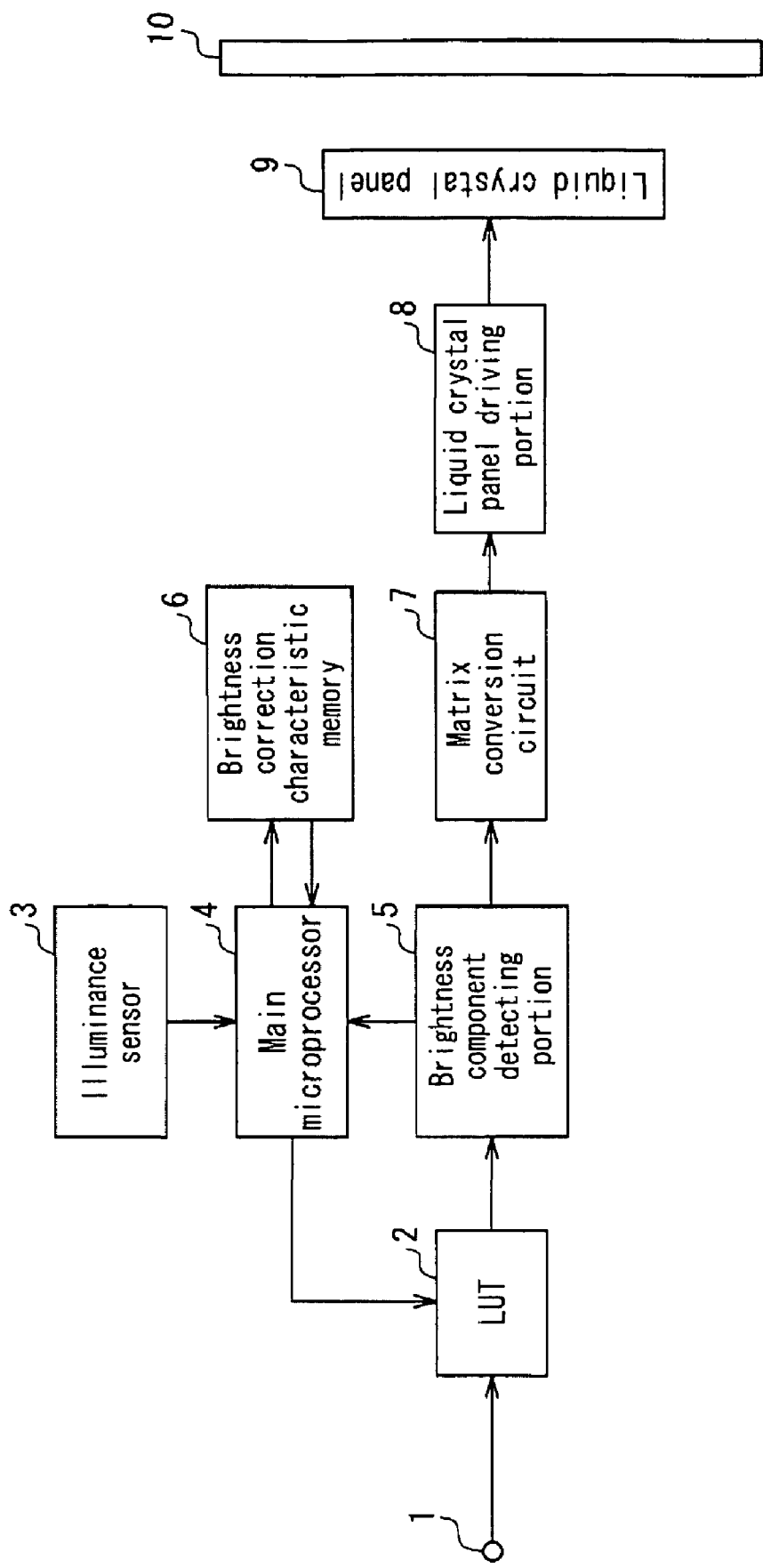
FIG. 1 is a block diagram showing a circuit configuration of an image display device according to Embodiment 1 of the present invention.

1 Video signal input terminal
2 LUT (Look-up table)
3 Illuminance sensor
4 Main microprocessor
5 Brightness component detecting portion
6 Brightness correction characteristic memory
7 Matrix conversion circuit
8 Liquid crystal panel driving portion
9 Liquid crystal panel
10 Screen
11 Projection lens position detecting portion
12 Test signal generating portion
13 Self-emitting-light component memory
20 Projector
21 Projection lens
30 Environmental illumination

DESCRIPTION OF THE INVENTION

Based on the above-described configuration, the image display method of the present invention can assume the following various embodiments.

More specifically, in the step of selecting the illuminance range, a reference range can be set based on the illuminance detection value obtained by the previous measurement and the selected difference values, so that one of the plurality of illuminance ranges is selected according to a position of the illuminance detection value obtained by the current measurement in the reference range.

Preferably, the difference values and the illuminance ranges are set according to respective installation states of the image display device between a floor-standing state and a ceiling-hung state, and the method further includes the step of selecting whether an installation state of the image display device is of the floor-standing state or the ceiling-hung state, so that processing is performed for selecting the illuminance range and the brightness correction characteristic data by using the difference values and the illuminance range corresponding to the selected installation state.

Preferably, the difference values are set according to a zoom position of the projection lens, and the method further includes the step of recognizing the zoom position of the projection lens, so that processing is performed for selecting the illuminance range by using the difference values corresponding to a result of recognizing the zoom position of the projection lens.

Preferably, the method further includes the steps of: performing projection of test images generated by changing a brightness component of a video signal to a predetermined state, and storing as a self-emitting-light component an illuminance detection value due to reflected light from the screen; and setting the difference values corresponding to the brightness component based on the self-emitting-light component.

Based on the above-described configuration, the image display device of the present invention can assume the following various embodiments.

More specifically, when selecting the illuminance range, the control portion can set a reference range based on the illuminance detection value obtained by the previous measurement and the selected difference values, so as to select one of the plurality of illuminance ranges according to a position of the illuminance detection value obtained by the current measurement in the reference range.

Preferably, the difference values and the illuminance ranges are set according to respective installation states of the image display device between a floor-standing state and a ceiling-hung state, and the control portion includes a selection portion for selecting whether an installation state of the image display device is of the floor-standing state or the ceiling-hung state, and performs processing for selecting the illuminance range and the brightness correction characteristic data by using the difference values and the illuminance range corresponding to the selected installation state.

Preferably, the difference values are set according to a zoom position of the projection lens, and the device further includes a projection lens position detecting portion for detecting the zoom position of the projection lens, so that the control portion performs processing for selecting the illuminance range by using the difference values corresponding to a result of the detection by the projection lens position detecting portion.

Preferably, the device further includes: a test signal generating portion for performing projection of test images generated by changing a brightness component of a video signal to a predetermined state; and a self-emitting-light component memory for storing as a self-emitting-light component an illuminance detection value due to reflected light from the screen that is obtained by the projection of the test images, and the control portion sets the difference values corresponding to the brightness component based on the data stored in the self-emitting-light component memory.

Hereinafter, embodiments of the present invention will be described in more detail with reference to the drawings.

Embodiment 1

Figure 2:
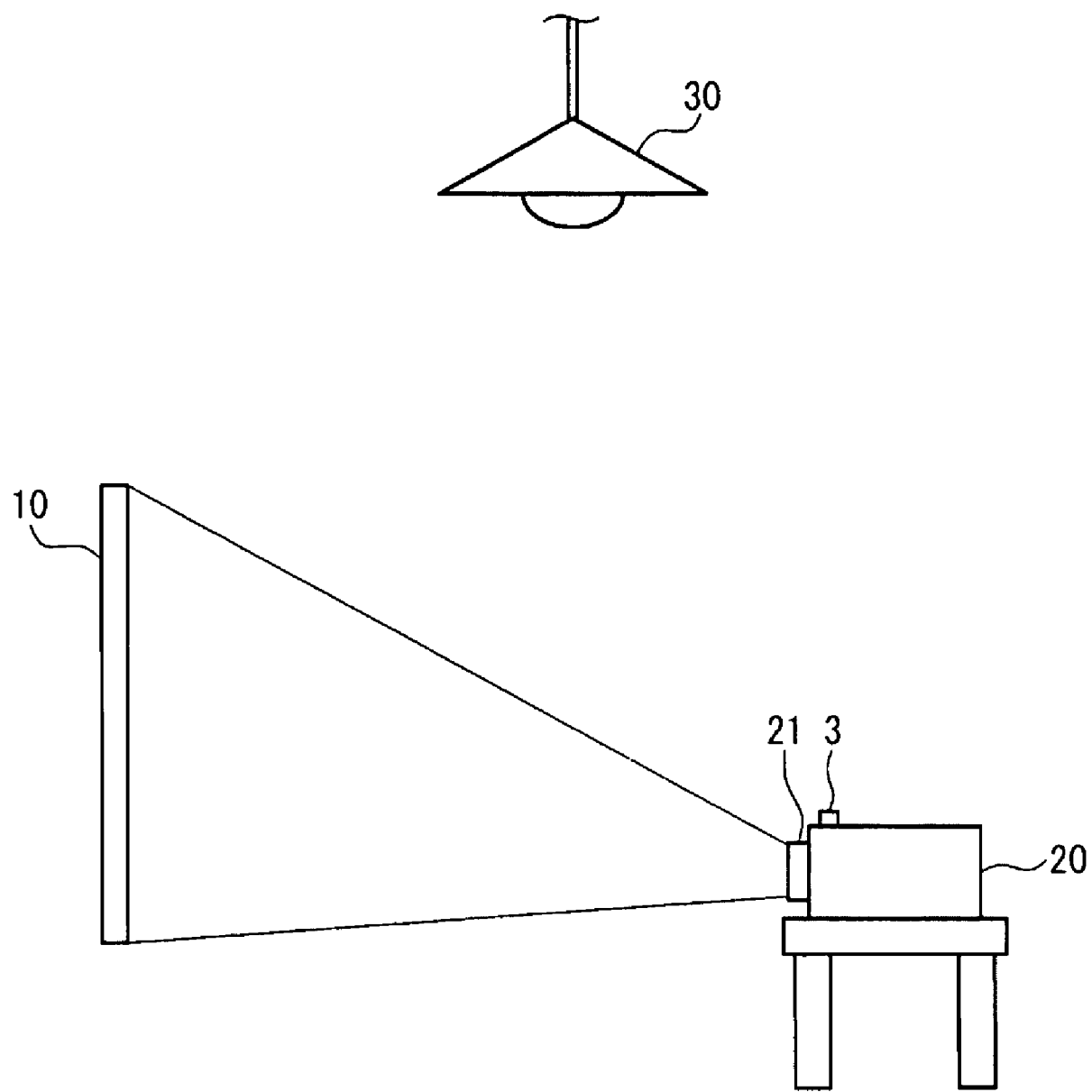
FIG. 2 is a schematic view showing a projector as the image display device according to the same embodiment.

FIG. 1 is a block diagram showing a circuit configuration of an image display device according to Embodiment 1 of the present invention. FIG. 2 is a schematic view showing a projector 20 in use as an exemplary image display device having the circuit shown in FIG. 1.

As shown in FIG. 2, the projector 20 projects light modulated by a spatial optical modulating element (not shown) such as a liquid crystal panel onto a screen 10 via a projection lens 21. An illuminance sensor 3 is attached to a top plate surface of the projector 20. The illuminance sensor 3 measures the illuminance by illumination light from ambient environmental illumination 30, and the illuminance detection value thus obtained is used as an illuminance signal in the circuit shown in FIG. 1. The illuminance detection value thus measured includes an influence of an image projected by the projector 20 onto the screen 10 according to the state of an input video signal.

As shown in FIG. 1, an input video signal from a video signal input terminal 1 is subjected to predetermined correction processing based on a LUT look-up table) 2, and the thus obtained signal then is input to a brightness component detecting portion 5. The brightness component detecting portion 5 detects a brightness component included in the input video signal, and inputs the detection result as brightness information to a main microprocessor 4 as a control portion. On the other hand, the illuminance sensor 3 inputs to the main microprocessor 4 the illuminance detection value obtained by measuring the illuminance of the ambient environment at regular time intervals.

Based on the illuminance detection value obtained from the illuminance sensor 3 and the brightness information obtained from the brightness component detecting portion 5, the main microprocessor 4 selects an appropriate illuminance range from a plurality of ranges formed by dividing an estimated extent of the illuminance of the ambient environment. A brightness correction characteristic memory 6 stores brightness correction characteristic data for correcting the brightness of the input video signal within an appropriate range according to the illuminance of the ambient environment. The brightness correction characteristic data is obtained experimentally in advance so as to correspond to each of the illuminance ranges. Detailed descriptions of the illuminance ranges and the brightness correction characteristic data will be given later.

The main microprocessor 4 transfers the previously prepared brightness correction characteristic data corresponding to the selected illuminance range from the brightness correction characteristic memory 6 to the LUT 2. The LUT 2 corrects the input video signal before inputting the same to the brightness component detecting portion 5 as described above based on the transferred and stored brightness correction characteristic data.

A matrix conversion circuit 7 is provided for converting a YUV signal into a RGB signal. A liquid crystal panel driving portion 8 drives a liquid crystal panel 9 based on the RGB signal generated by the matrix conversion circuit 7. As a result of correcting the input/output characteristics as described above, an image is projected onto the screen 10 based on an output video signal whose brightness has been corrected appropriately according to a change in the brightness of the use environment. Although the device is configured to irradiate the liquid crystal panel 9 with light from a light source for the purpose of image projection, the light source and the like are not shown.

A description will be given of steps of an image display method according to the present embodiment that is performed by the circuit shown in FIG. 1, with reference to a flowchart in FIG. 3.

Figure 3:
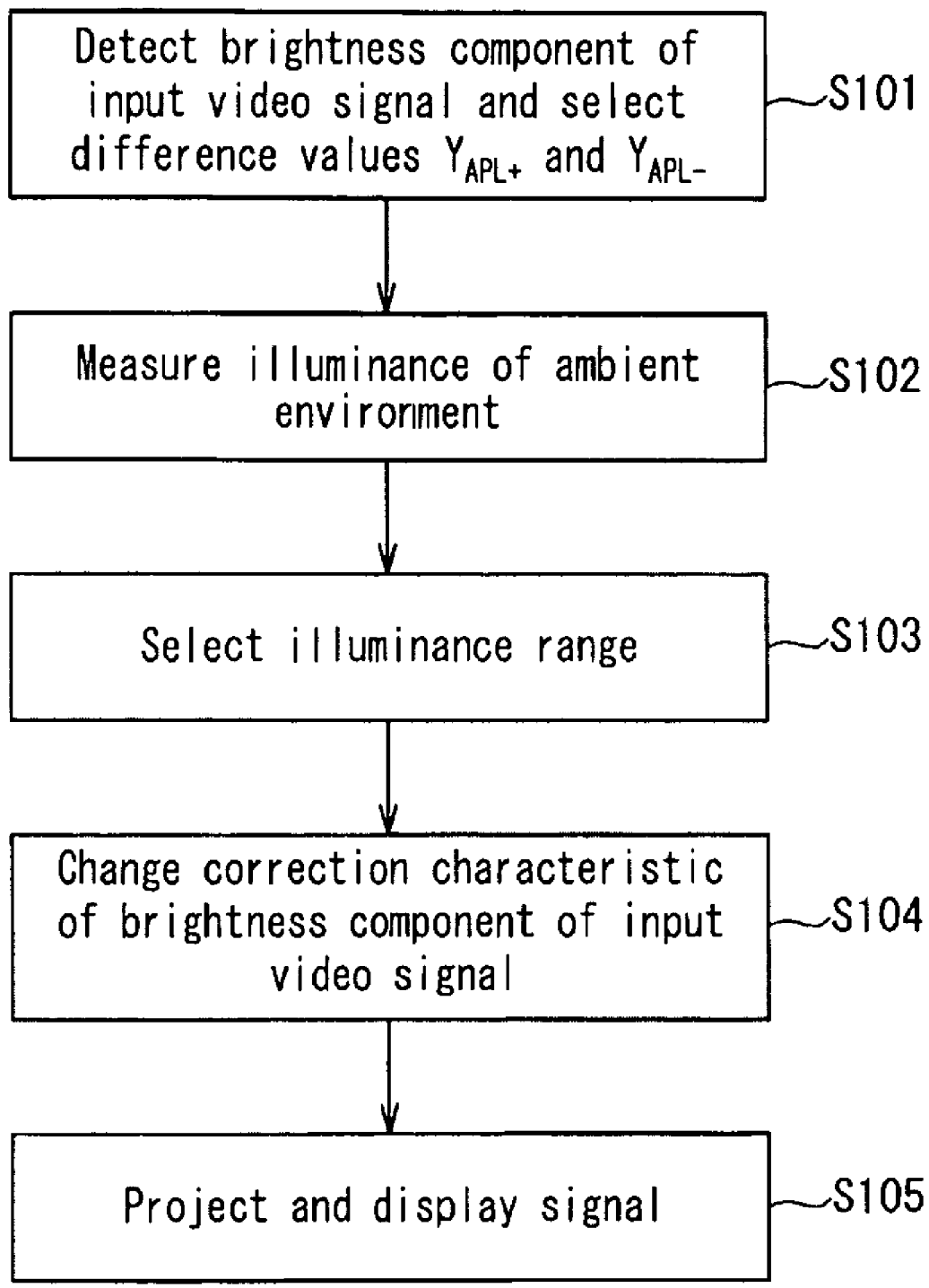
FIG. 3 is a block diagram showing steps of an image display method according to the same embodiment.

The image display method of the present embodiment includes Steps S101 to S105 as shown in FIG. 3. The following is a general description of each of the steps.

Figure 4:
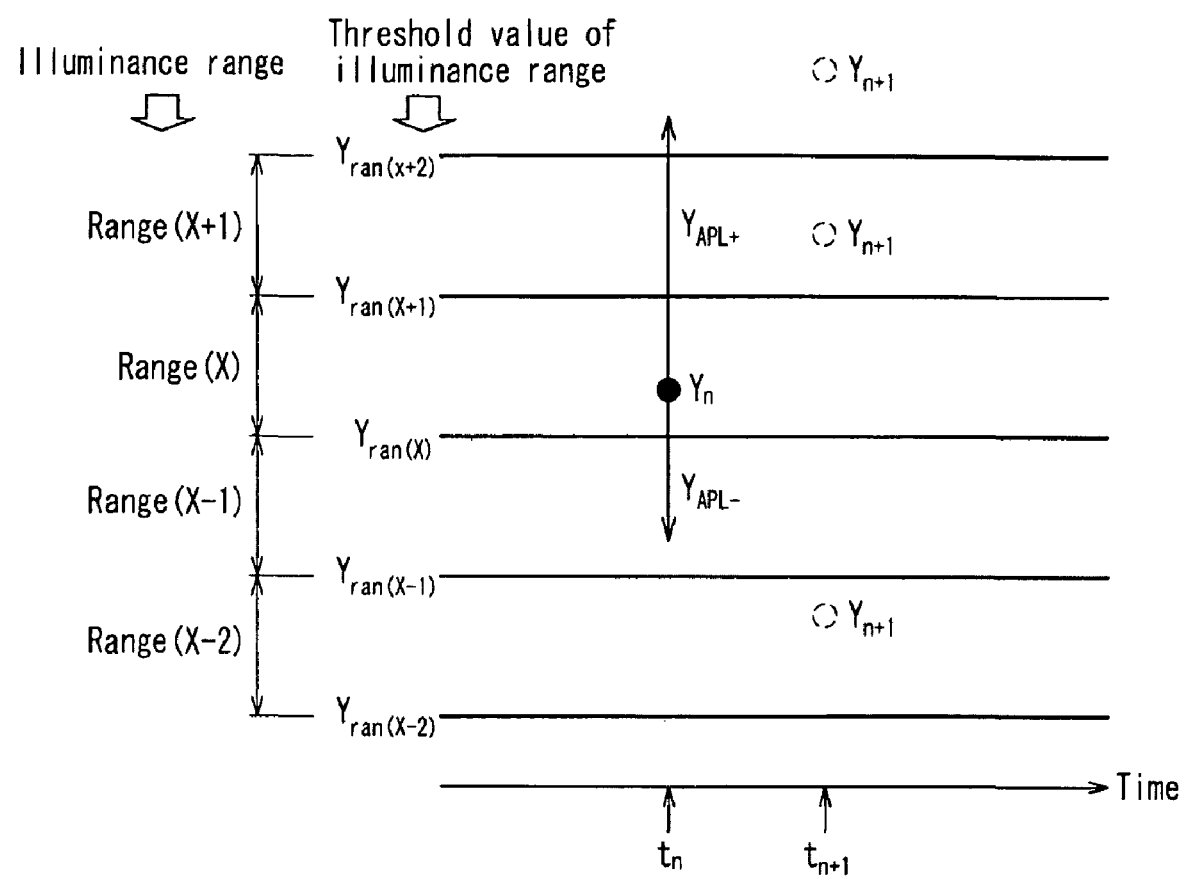
FIG. 4 is a schematic diagram showing a method for selecting an illuminance range in the same image display method.

S101: Step of detecting the brightness component of the input video signal and selecting difference values $Y_{APL+}$ and $Y_{APL-}$ provided according to the brightness component S102: Step of measuring the illuminance of the ambient environment S103: Step of selecting the illuminance range S104: Step of changing the brightness component of the input video signal according to the illuminance range S105: Step of projecting and displaying a video signal Here, a description will be given of definitions of the positive-side difference value $Y_{APL+}$, the negative-side difference value $Y_{APL-}$, and the illuminance ranges, with reference to FIG. 4. In FIG. 4, the horizontal axis indicates the passage of time, and the vertical axis indicates the illuminance. In the present embodiment, an estimated extent of the illuminance of the ambient environment is divided into a plurality of illuminance ranges (x). In FIG. 4, the four illuminance ranges (x), i.e., a range (X−2), a range (X−1), a range (X), and a range (X+1), are set.

A boundary value of each of the illuminance ranges (x) is indicated by a threshold value $Y_{ran(x)}$. In FIG. 4, the lower limit of the range (X−2) is indicated by a threshold value $Y_{ran(X-2)}$, the lower limit of the range (X−1) is indicated by a threshold value $Y_{ran(X-1)}$, the lower limit of the range (X) is indicated by a threshold value $Y_{ran(X)}$, the lower limit of the range (X+1) is indicated by a threshold value $Y_{ran(X+1)}$, and the lower limit of a range over the range (X+1) is indicated by a threshold value $Y_{ran(X+2)}$. The division into the illuminance ranges (x) can be made as appropriate depending on how the brightness of the input video signal is to be corrected. Although each of the threshold values $Y_{ran(x)}$ is a value corresponding to the illuminance, a value appropriately converted from the illuminance value is used therefor for convenience in processing in relation to other values.

Illuminance detection values $Y_n$ and $Y_{n+1}$ measured by the illuminance sensor at a time $t_n$ and a time $t_{n+1}$, respectively, are shown. It should be noted that the illuminance detection value refers to a value converted from the illuminance value similarly to the threshold values $Y_{ran(x)}$. For the illuminance detection value $Y_{n+1}$ at the time $t_{n+1}$, three different examples of the measured value are shown. Further, for the illuminance detection value $Y_n$, the difference values $Y_{APL+}$ and $Y_{APL-}$ selected according to the brightness component of the input video signal are shown. Each of the difference values $Y_{APL+}$ and $Y_{APL-}$ is also a value corresponding to the threshold value $Y_{ran(x)}$, and a value converted from the illuminance value is used therefor.

The difference values $Y_{APL+}$ and $Y_{APL-}$ are values to be added and subtracted, respectively, to/from the detected brightness component value of the input video signal. The difference values $Y_{APL+}$ and $Y_{APL-}$ are set previously so as to be changed according to the magnitude of the brightness component value. For example, the difference values are set to be large when an APL (Average Picture Level; an average brightness component value on the screen) value is large, while the difference values are set to be small when the APL value is small. The difference values $Y_{APL+}$ and $Y_{APL-}$ are set to be different from each other as shown in the figure. Usually, the difference value $Y_{APL+}$ preferably is set to be larger than the difference value $Y_{APL-}$. The difference values $Y_{APL+}$ and $Y_{APL-}$ may be set to be equal. Alternatively, only the positive-side difference value may be used to achieve a due effect.

Each of the steps shown in FIG. 3 will be described in detail. In Step s101 in FIG. 3, the brightness component of the input video signal is detected, and the difference values $Y_{APL+}$ and $Y_{APL-}$ are selected according to setting based on the detected brightness component. This process is performed so that the influence of the input video signal upon the ambient illuminance is reflected in the brightness correction based on the illuminance detection value obtained from the illuminance sensor 3. The difference values $Y_{APL+}$ and $Y_{APL-}$ are set previously based on measured values. For example, attention is focused only on a brightness signal associated with the brightness of a picture of the input video signal. When an image is projected by video signals whose brightness is at the maximum level, the minimum level, and the middle level between the maximum level and the minimum level, values of the influence of the illuminance by reflected light from the screen upon the illuminance of the ambient environment measured by the illuminance sensor 3 are measured. Based on the obtained influence values, the difference values $Y_{APL+}$ and $Y_{APL-}$ are set so as to correspond to the respective brightness levels and are stored previously.

Although in the present embodiment, an average value of the brightness signal is used to extract the characteristics of the input video signal, a RGB input signal or distribution information of the brightness signal also may be used.

In Step S102 of measuring the illuminance of the ambient environment, the illuminance sensor 3, which may be attached to the top plate surface of the projector 20 as shown in the schematic view of FIG. 2, measures the illuminance by illumination light from the ambient environmental illumination 30. The measured illuminance value is subjected to A/D conversion, and the thus obtained value is input to the main microprocessor 4.

In Step S103 of selecting the illuminance range, one of the illuminance ranges shown in FIG. 4 is selected based on the difference values $Y_{APL+}$ and $Y_{APL-}$ selected in Step S101 and the illuminance detection value obtained in Step S102.

In Step S104 of changing the brightness component of the input video signal, the previously prepared data in the brightness correction characteristic memory 6 is transferred to the LUT 2 according to a change of the illuminance range selected in Step S103 (see FIG. 1), so that the LUT 2 is rewritten. As a result, the brightness of the input video signal is corrected.

In Step S105 of projecting and displaying a video signal, an image is projected and displayed on the screen based on an output video signal obtained as a result of correcting the brightness of the input video signal in Step S104.

The process of selecting the illuminance range in Steps S101 to S103 above will be described by way of a specific example with reference to the schematic diagram in FIG. 4 and a flowchart in FIG. 5.

Figure 5:
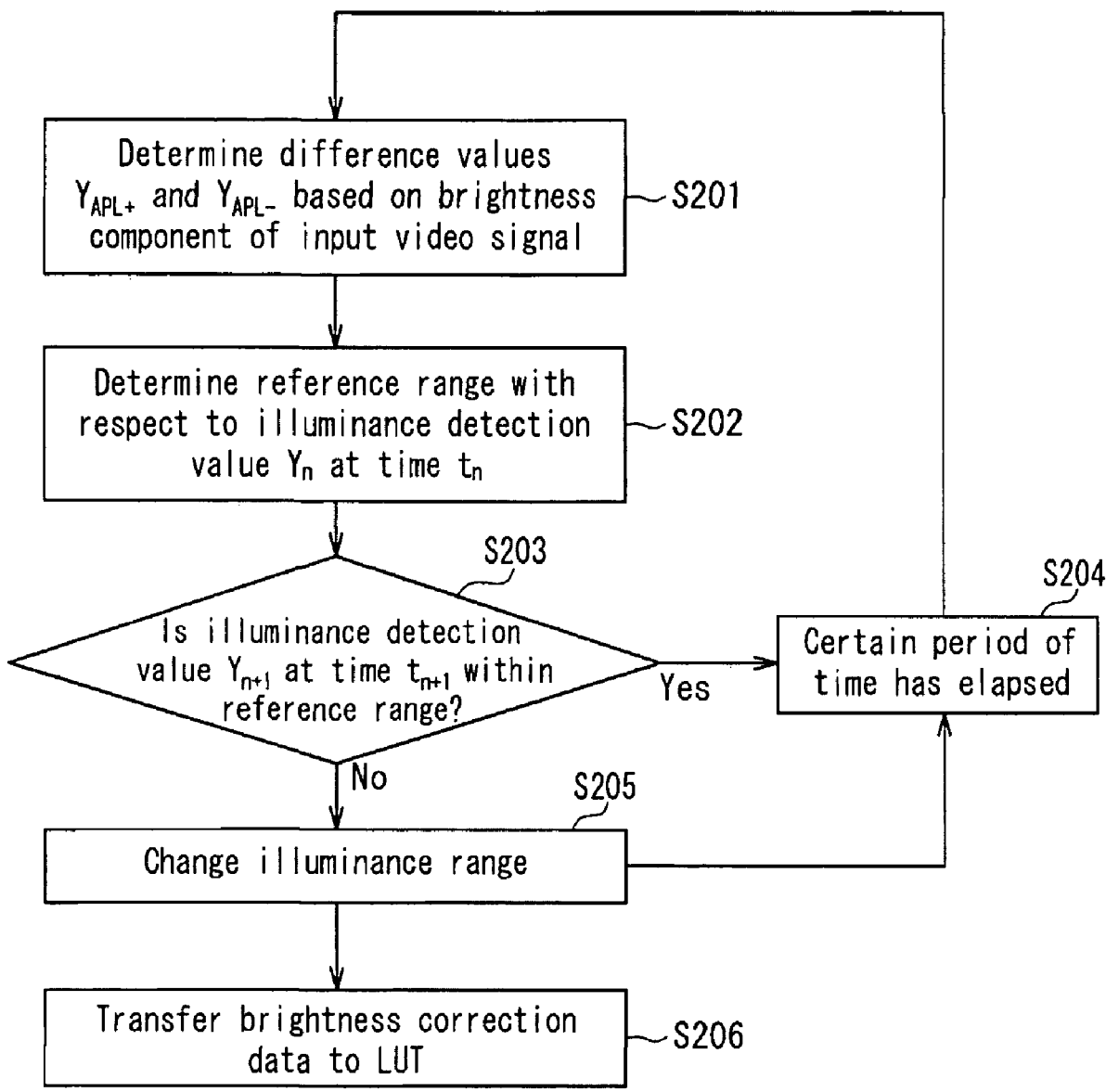
FIG. 5 is a flowchart showing the method for selecting an illuminance range in the same image display method.

Initially, in Step S201 in FIG. 5, the difference values $Y_{APL+}$ and $Y_{APL-}$ are determined based on the brightness component of the input video signal in accordance with the previously set and stored correspondence as described above.

Then, in Step S202, the difference values $Y_{APL+}$ and $Y_{APL-}$ obtained in Step S201 are added and subtracted to/from the illuminance sensor value $Y_n$ (within the illuminance range X) at a current time (time $t_n$) shown in FIG. 4, thereby calculating a reference range, which is a range obtained by making the illuminance range wider.

Thereafter, in Step S203, it is determined whether the illuminance sensor value $Y_{n+1}$ measured this time (time $t_{n+1}$) is within the reference range obtained in Step S202.

When the illuminance sensor value $Y_{n+1}$ is within the reference range, i.e., in the case of $Y_n - Y_{APL-} < Y_{n+1} < Y_n + Y_{APL+}$, the current range X is maintained. Then, after a certain period of time has elapsed, the above-described operation is repeated (Step S204).

When the illuminance sensor value $Y_{n+1}$ is not within the reference range, i.e., in the case of $Y_{n+1} > Y_n + Y_{APL+}$ and $Y_{n+1} > Y_{ran(X+1)}$, or the case of $Y_{n+1} < Y_n - Y_{APL-}$ and $Y_{n+1} < Y_{ran(X)}$, the current illuminance range X is changed to the next higher range (X+1) or the next lower range (X−1) (Step S205), followed by Step S204.

The illuminance range obtained in Step S205 is transferred to the LUT (Step S206), and the LUT 2 is rewritten based on this illuminance range as shown in Step S104 in FIG. 3. As a result, the brightness of the input video signal is corrected.

As described above, the difference values $Y_{APL+}$ and $Y_{APL-}$ are changed according to the brightness component of the input video signal. For example, the difference values are set to be large when the APL value is large, while the difference values are set to be small when the APL value is small. Consequently, the width of the illuminance range is variable in accordance with the APL. In this manner, by making the width (hysteresis) of the illuminance range variable, it is possible to select an appropriate range stably with respect to the illuminance measured at regular time intervals even when the brightness of the ambient environment is changed.

Experiments revealed that the measurement of the illuminance at regular time intervals preferably is performed at intervals of within several 100 ms to several seconds. When the measurement interval is set to be shorter, a good response to changing illuminance is achieved, but malfunction occurs when the illuminance changes unstably. Thus, in consideration of both the stability and the response to a change in the illuminance, it was determined that a measurement interval of within several 100 ms to several seconds was appropriate.

As described above, according to the present embodiment, the brightness component of the input video signal is detected, and the intensity of reflected light from the screen due to the input video signal is taken into consideration, whereby the brightness can be corrected stably according to a change in the brightness of a use environment even when the brightness of the input video signal is changed continuously like a moving image video signal.

Embodiment 2

Figure 6:
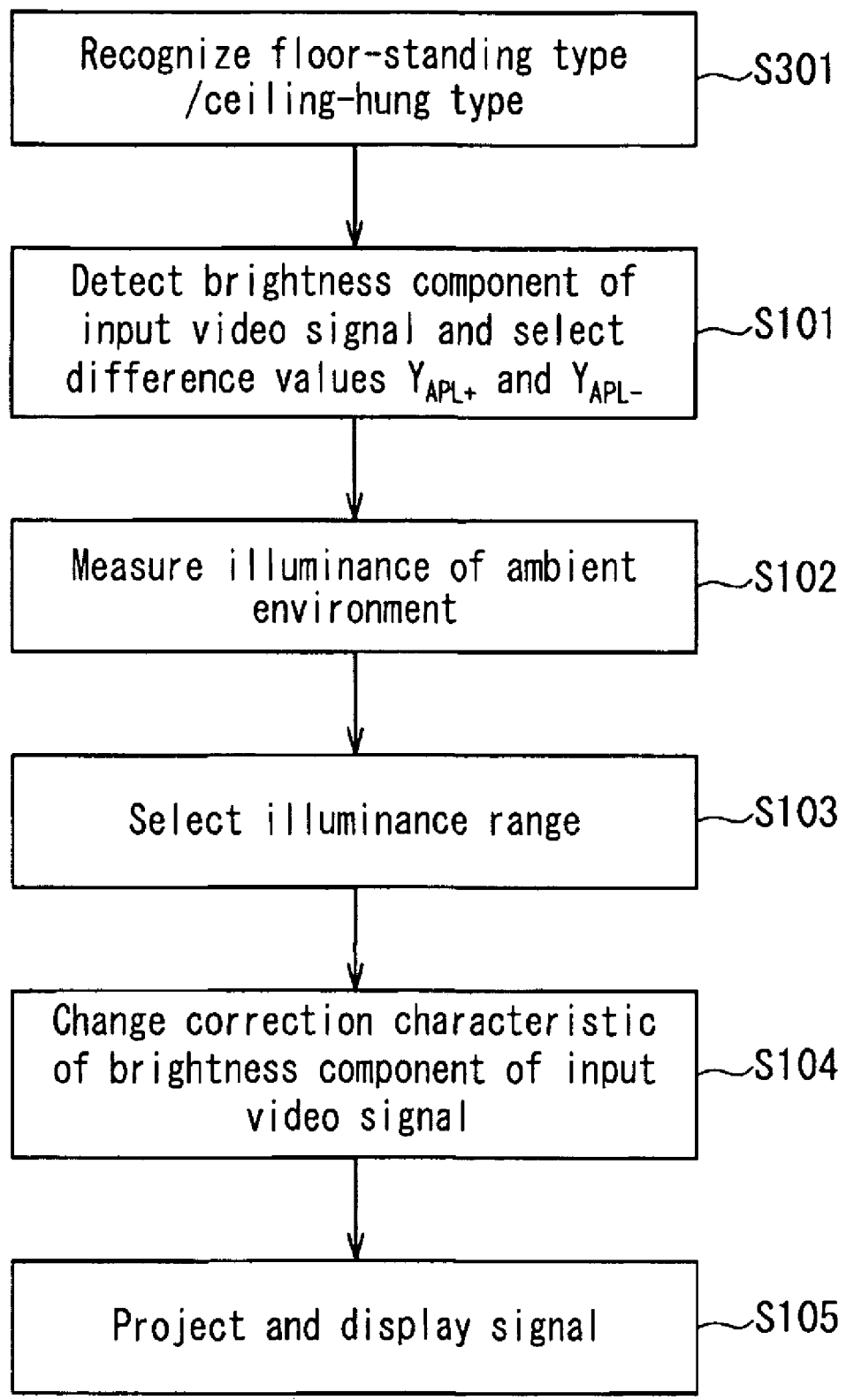
FIG. 6 is a flowchart showing steps of an image display method according to Embodiment 2 of the present invention.

FIG. 6 is a flowchart showing steps of an image display method according to Embodiment 2 of the present invention. An image display device according to the present embodiment has the same circuit configuration as in Embodiment 1 shown in FIG. 1. Further, the image display device has the same configuration as the projector 20 in Embodiment 1 shown in FIG. 2.

The image display method according to the present embodiment is the same as that in Embodiment 1 shown in FIG. 3 except that new Step S301 is added before Step S101. Thus, the same steps are denoted with the same reference numerals as in FIG. 3, and repeated descriptions thereof will be omitted.

Step S301 is a step of selecting whether the image display device is installed in a floor-standing state or a ceiling-hung state. It was verified that in the configuration in which the illuminance sensor is attached to the top plate surface of the projector 20 as shown in FIG. 2, the measured value of the illuminance sensor 3 when the projector 20 is in a ceiling-hung state is about 1/10 that when the projector 20 is in a floor-standing state. Thus, in Step S301, the installation state of the projector 20 is selected manually by a user on an on-screen menu, for example, and the selected information is input to the circuit with the configuration shown in FIG. 1.

With respect to the threshold value $Y_{ran(X)}$ and the like of the illuminance sensor for defining the illuminance ranges (x) and the difference values $Y_{APL+}$ and $Y_{APL-}$ provided for taking the influence of the input video signal into account as shown in FIG. 3, appropriate values adjusted to the respective cases of a floor-standing state and a ceiling-hung state are set, and theses values are stored in the main microprocessor 4. By selecting whether the image display device is installed in a floor-standing state or a ceiling-hung state in Step S301, it is possible to select appropriate values according to the selected state.

Embodiment 3

Figure 7:
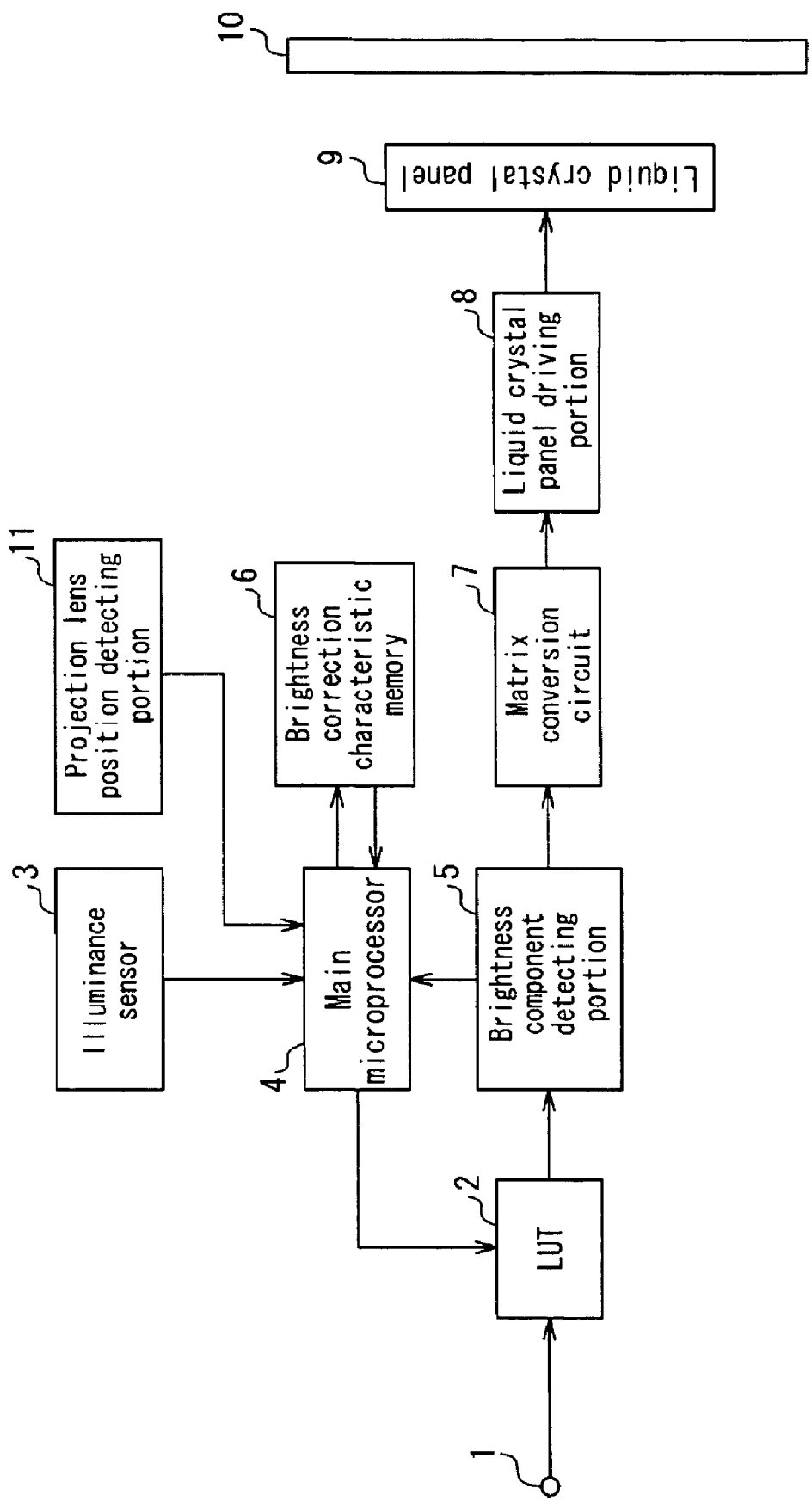
FIG. 7 is a block diagram showing a circuit configuration of an image display device according to Embodiment 3 of the present invention.

FIG. 7 is a block diagram showing a circuit configuration of an image display device according to Embodiment 3 of the present invention. This circuit configuration is different from that in Embodiment 1 shown in FIG. 1 in that a projection lens position detecting portion 11 is provided, so that its detection result is input to the main microprocessor 4. The projection lens detecting portion 11 is provided for detecting whether a zoom position of the projection lens is at a wide angle end or a telephoto end. Other components of the circuit configuration of the present embodiment are the same as those in Embodiment 1, and the same components are denoted with the same reference numerals and repeated descriptions thereof will be omitted.

Figure 8:
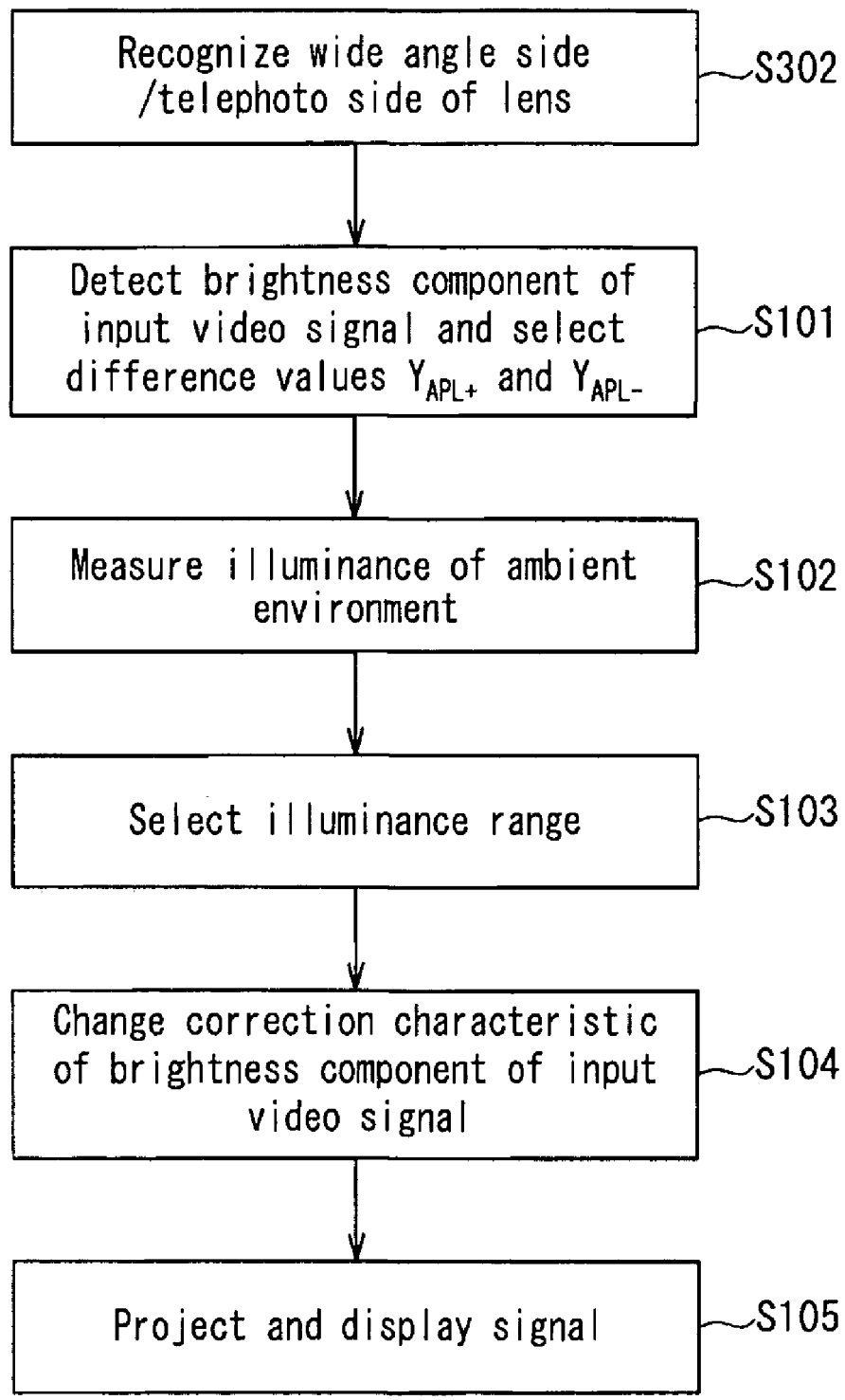
FIG. 8 is a flowchart showing steps of an image display method according to the same embodiment.

FIG. 8 is a flowchart showing steps of an image display method according to the present embodiment. This image display method is the same as that in Embodiment 1 shown in FIG. 3 except that new Step S302 is added before Step S101. Thus, the same steps are denoted with the same reference numerals as in FIG. 3, and repeated descriptions thereof will be omitted.

Step S302 is a step of selecting a wide angle side or a telephoto side of the projection lens. More specifically, in a state where the projector is installed, the position detecting portion 11 attached to the projection lens detects automatically whether the projection lens is positioned on the wide angle side or the telephoto side. The detection result is supplied to the main microprocessor 4, so that the wide angle side or the telephoto side is selected in processing in a later step.

The wide angle side of the projector refers to a side on which a projected image is the largest in size, and the telephoto side refers to a side on which a projected image is the smallest in size when an image is projected onto a screen at the same projection position. In order to project a picture on the telephoto side in the same screen size as on the wide angle side, a distance from the screen to the projector becomes longer. Consequently, the influence of the input video signal upon the environmental illuminance is smaller on the telephoto side than on the wide angle side. On this account, the influence of the input video signal is set so as to correspond to the wide angle side and the telephoto side, respectively, of the projection lens. By selecting the wide angle side or the telephoto side of the projection lens, with respect to the threshold value $Y_{ran(x)}$ and the like of the illuminance sensor for defining the illuminance ranges (x) and the difference values $Y_{APL+}$ and $Y_{APL-}$ provided for taking the influence of the input video signal into account, appropriate values are selected according to the selected side.

Embodiment 4

Figure 9:
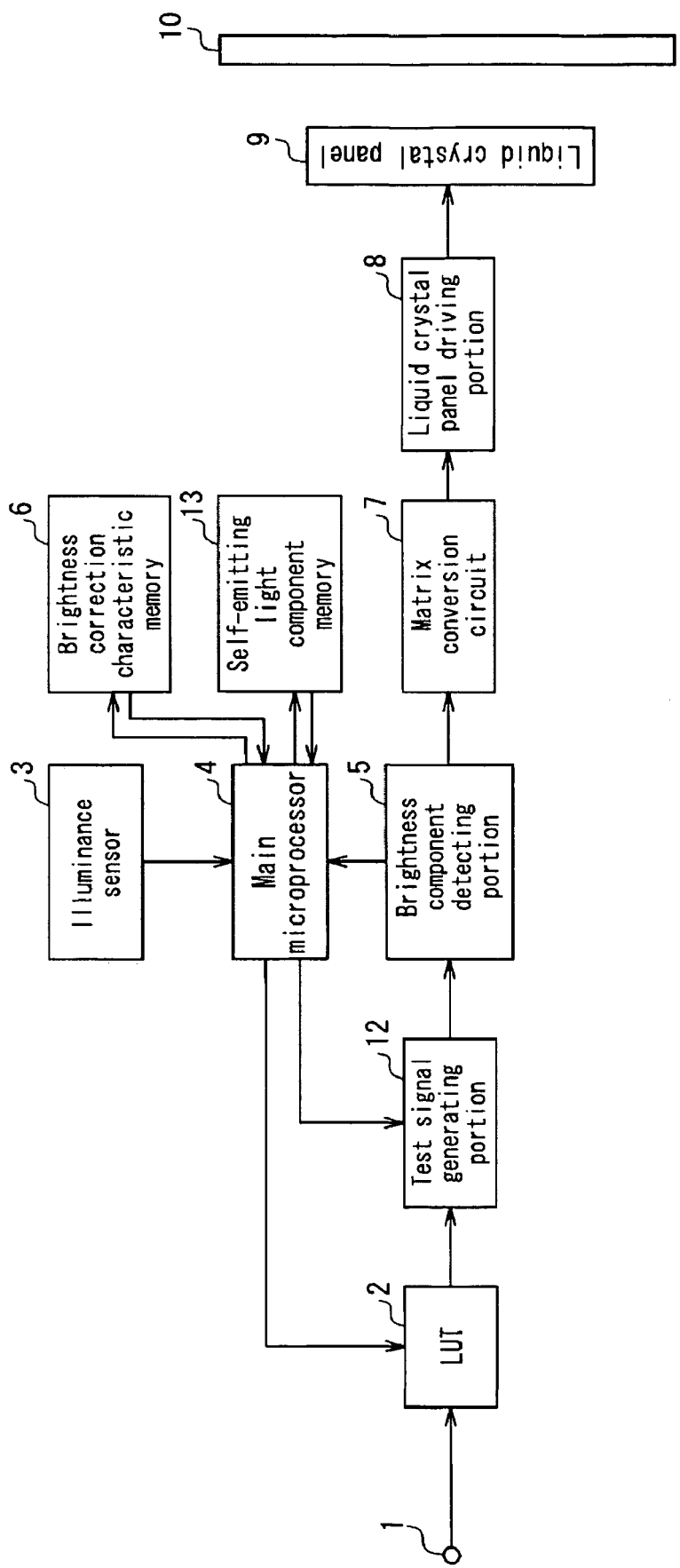
FIG. 9 is a block diagram showing a circuit configuration of an image display device according to Embodiment 4 of the present invention.

FIG. 9 is a block diagram showing a circuit configuration of an image display device according to Embodiment 4 of the present invention. This circuit configuration is different from that in Embodiment 1 in that a test signal generating portion 12 and a self-emitting-light component memory 13 are provided. Other components of the circuit configuration of the present embodiment are the same as those in Embodiment 1, and the same components are denoted with the same reference numerals and repeated descriptions thereof will be omitted.

In the present embodiment, the test signal generating portion 12 generates a test video signal, which enables projection of test images using the liquid crystal panel 9. The main microprocessor 4 controls the test signal generating portion 12 so that the average brightness value APL is changed, for example. In the case of test projection and display, the illuminance sensor measures the illuminance by reflected light from the screen when an image is projected by the test signal, and the measured illuminance is stored as a self-emitting-light component in the self-emitting-light component memory 13. Thus, the test signal generating portion 12 need not be operated in the case of usual image projection.

With respect to intermediate average brightness, when characteristics of output of light from the projector with respect to input of a video signal (input/output characteristics) are known, for example, the self-emitting-light component may be calculated in the following manner instead of actually measuring the self-emitting-light component by changing the average brightness value APL by the test signal generating portion 12. That is, using a plurality of variables α (x) based on the input/output characteristics, the self-emitting-light component is calculated by α (x) ($APL_{max}$−$APL_{min}$), where α (x) is an output characteristic value in the case of normalizing the input/output characteristics with respect to APL of arbitrary x%, $APL_{min}$ is an illuminance detection value measured under the condition that image projection is performed with the minimum average brightness value APL, and $APL_{max}$ is an illuminance detection value measured under the condition that image projection is performed with the maximum average brightness value APL. The self-emitting-light component due to the reflected light can be approximate to $APL_{max}$−$APL_{min}$ at the maximum. Accordingly, the self-emitting-light component due to a possible arbitrary average brightness value APL can be represented by the value of α (x) ($APL_{max}$−$APL_{min}$).

For example, when the input/output characteristics are of 2.2th-power gamma correction, examples of the variable α (x) are as follows. Using any of these values, the self-emitting-light component is calculated by α (x) ($APL_{max}$−$APL_{min}$).

In the case where APL is 25%, α (25)=$0.25^{2.2}$,
in the case where APL is 50%, α (50)=$0.5^{2.2}$,
in the case where APL is 75%, α (75)=$0.75^{2.2}$ and
in the case where APL is 100%, α (100)=$1.0^{2.2}$.

Then, $Y_{APL+}$ or $Y_{APL-}$ is set to be a value approximated by the following self-emitting-light components, followed by control in the following manner.

In the case where APL is 0% to 25%, the self-emitting-light component using α (25),
in the case where APL is 25% to 50%, the self-emitting-light component using α (50),
in the case where APL is 50% to 75%, the self-emitting-light component using α (75), and
in the case where APL is 75% to 100%, the self-emitting-light component using α (100).

Alternatively, in addition to the measurement of the illuminance $APL_{min}$ and $APL_{max}$ due to the self-emitting-light component with respect to the average brightness value APL at the minimum and the maximum, a self-emitting-light component with respect to an intermediate average brightness value APL also may be taken as a measuring object. Preferably, the measurement environment is relatively dark.

Figure 10:
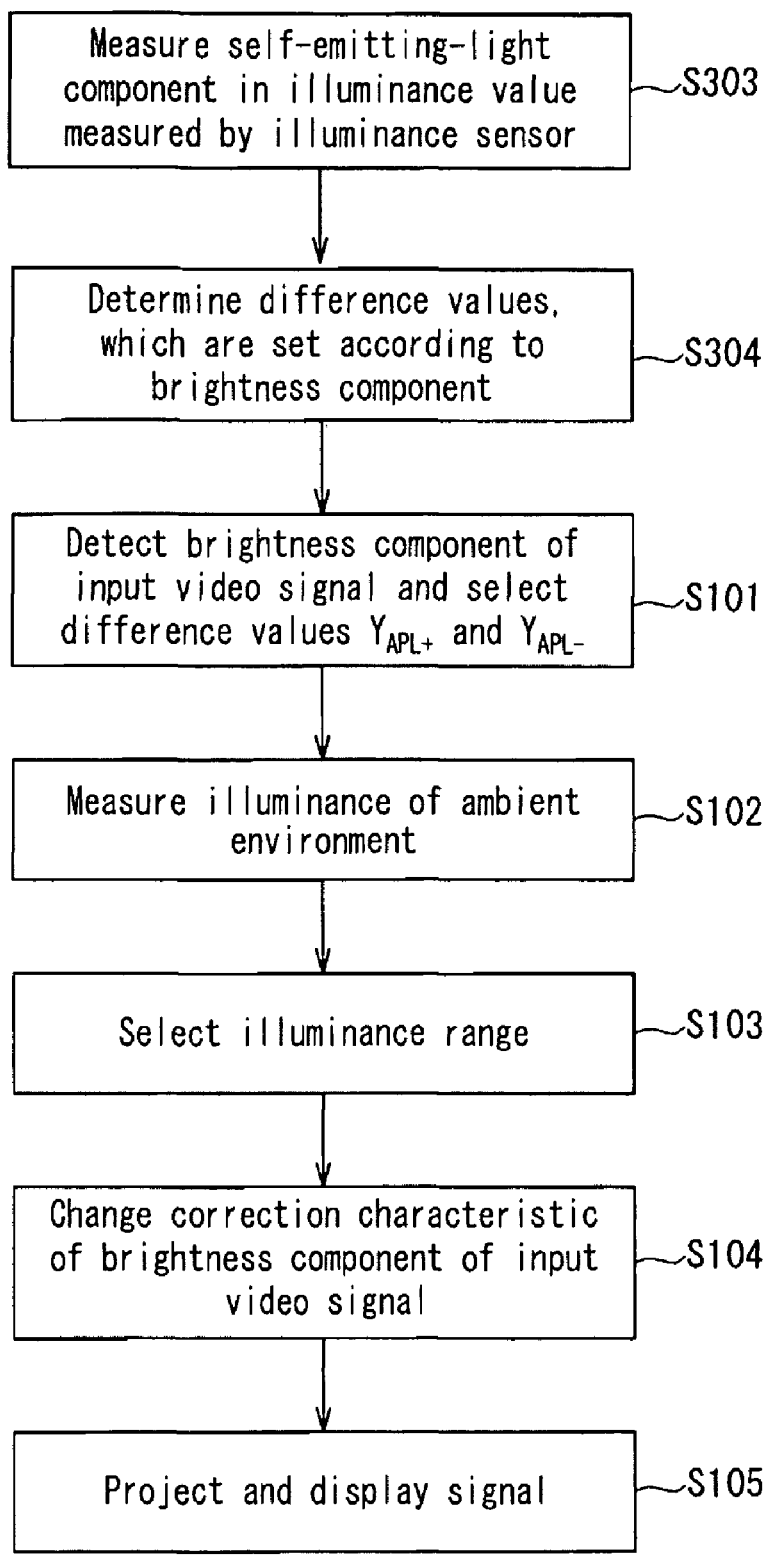
FIG. 10 is a flowchart showing steps of an image display method according to the same embodiment.

FIG. 10 is a flowchart showing steps of an image display method according to the present embodiment that is performed by the circuit configured as shown in FIG. 9. This image display method is the same as that in Embodiment 1 shown in FIG. 3 except that new Steps S303 and S304 are added before Step S101. Thus, the same steps are denoted with the same reference numerals as in FIG. 3, and repeated descriptions thereof will be omitted.

In Step S303, the test signal generating portion 12 previously changes the brightness component of the input video signal using the test signal, and measures the self-emitting-light component due to the reflected light from the screen. The measurement result is stored in the self-emitting-light component memory 13.

In that case, when the illuminance sensor measures the illuminance $APL_{min}$ and $APL_{max}$, for example, in a state where the image display device is installed in a constant state and the ambient environment is not varied, the self-emitting-light component due to the reflected light can be approximate to $APL_{max}-APL_{min}$ at the maximum. If $APL_{min}$ is so large that it cannot be ignored, a value $LAMP_{off}$ of the illuminance sensor is measured and stored before a lamp is turned on. Consequently, the self-emitting-light component due to the reflected light is $APL_{max}-LAMP_{off}$ at the maximum and $APL_{min}-LAMP_{off}$ at the minimum. This measurement result is stored.

In Step S304, based on the measurement result stored in Step S303, the difference values $Y_{APL+}$ and $Y_{APL-}$ are set, which are determined according to the brightness component of the input video signal. Specifically, since the difference values $Y_{APL+}$ and $Y_{APL-}$ refer to the influence of the input video signal upon the ambient illuminance, i.e., the influence upon the illuminance measured by the illuminance sensor 3, they can be set based on the illuminance of the self-emitting-light component. As described above, with respect to the intermediate average brightness, the brightness of the self-emitting-light component can be calculated by $\alpha$ (x) × ($APL_{max}-APL_{min}$) using the plurality of variables $\alpha$ (x) without obtaining an actual measurement result.

As described above, the brightness component of the input video signal is detected, and the reflected light from the screen due to the input video signal is taken into consideration according to each installation state, whereby the brightness can be corrected stably according to a change in the brightness of the use environment in any installation state even when the brightness of the input video signal is changed continuously like a moving image video signal.

INDUSTRIAL APPLICABILITY

The image display method and the image display device according to the present invention enables stable brightness correction according to a change in the brightness of a use environment even when the brightness of an input video signal is changed continuously like a moving image video signal, and thus they are useful for an image display device such as a projector.

The invention claimed is:

1. An image display method for displaying an image by using an image display device configured to modulate incident light with a spatial optical modulating element according to an input video signal so as to project an image onto a screen via a projection lens,
   wherein difference values, a plurality of illuminance ranges, and brightness correction characteristic data are used, where the difference values are defined as values representing a magnitude of an influence exerted by the image display based on the input video signal upon an illuminance of an ambient environment according to a brightness component of the input video signal and are set so as to correspond to the brightness component based on a result of measuring the magnitude of the influence previously, the illuminance ranges are set by dividing an extent of the illuminance of the ambient environment, and the brightness correction characteristic data are prepared for changing the brightness component of the input video signal according to each of the illuminance ranges;
   the method comprising the steps of:
   detecting the brightness component of the input video signal so as to select the difference values based on the detected value;
   measuring the illuminance of the ambient environment repeatedly at regular time intervals by using an illuminance sensor;
   selecting one of the plurality of illuminance ranges based on illuminance detection values obtained by previous and current measurements and the selected difference values;
   selecting the brightness correction characteristic data according to the selected illuminance range so as to correct the brightness component of the input video signal based on the brightness correction characteristic data; and
   projecting an image based on the input video signal.

2. The image display method according to claim 1, wherein in the step of selecting the illuminance range, a reference range is set based on the illuminance detection value obtained by the previous measurement and the selected difference values, so that one of the plurality of illuminance ranges is selected according to a position of the illuminance detection value obtained by the current measurement in the reference range.

3. The image display method according to claim 1,
   wherein the difference values and the illuminance ranges are set according to respective installation states of the image display device between a floor-standing state and a ceiling-hung state, and
   the method further comprises the step of selecting whether an installation state of the image display device is of the floor-standing state or the ceiling-hung state, so that processing is performed for selecting the illuminance range and the brightness correction characteristic data by using the difference values and the illuminance range corresponding to the selected installation state.

4. The image display method according to claim 1,
   wherein the difference values are set according to a zoom position of the projection lens;
   the method further comprising the step of recognizing the zoom position of the projection lens, so that processing is performed for selecting the illuminance range by using the difference values corresponding to a result of recognizing the zoom position of the projection lens.

5. The image display method according to claim 1, further comprising the steps of:
   performing projection of test images generated by changing a brightness component of a video signal to a predetermined state, and storing as a self-emitting-light component an illuminance detection value due to reflected light from the screen; and
   setting the difference values corresponding to the brightness component based on the self-emitting-light component.

6. An image display device configured to modulate incident light with a spatial optical modulating element according to an input video signal so as to project an image onto a screen via a projection lens, the device comprising:
- a brightness component detecting portion for detecting a brightness component of the input video signal;
- an illuminance sensor for measuring an illuminance of an ambient environment;
- a brightness correction characteristic memory for storing brightness correction characteristic data for correcting the brightness component of the input video signal;
- a brightness correction portion for correcting the brightness component of the input video signal based on the brightness correction characteristic data supplied from the brightness correction characteristic memory;
- an image projecting portion for projecting an image based on the corrected input video signal; and
- a control portion that is supplied with output signals from the brightness component detecting portion and the illuminance sensor, and stores difference values and a plurality of illuminance ranges, where the difference values are defined as values representing a magnitude of an influence exerted by the image display based on the input video signal upon the illuminance of the ambient environment according to the brightness component of the input video signal and are set so as to correspond to the brightness component based on a result of measuring the magnitude of the influence previously, and the illuminance ranges are set by dividing an extent of the illuminance of the ambient environment,
- wherein the illuminance sensor performs the measurement repeatedly at regular time intervals, and
- the control portion selects one of the plurality of illuminance ranges based on illuminance detection values obtained by previous and current measurements and the selected difference values, selects the brightness correction characteristic data according to the selected illuminance range from the brightness correction characteristic memory, and supplies the selected brightness correction characteristic data to the brightness correction portion.

7. The image display device according to claim 6, wherein when selecting the illuminance range, the control portion sets a reference range based on the illuminance detection value obtained by the previous measurement and the selected difference values, so as to select one of the plurality of illuminance ranges according to a position of the illuminance detection value obtained by the current measurement in the reference range.

8. The image display device according to claim 6,
wherein the difference values and the illuminance ranges are set according to respective installation states of the image display device between a floor-standing state and a ceiling-hung state, and
the control portion includes a selection portion for selecting whether an installation state of the image display device is of the floor-standing state or the ceiling-hung state, and performs processing for selecting the illuminance range and the brightness correction characteristic data by using the difference values and the illuminance range corresponding to the selected installation state.

9. The image display device according to claim 6,
wherein the difference values are set according to a zoom position of the projection lens;
the device further comprising a projection lens position detecting portion for detecting the zoom position of the projection lens, so that the control portion performs processing for selecting the illuminance range by using the difference values corresponding to a result of the detection by the projection lens position detecting portion.

10. The image display device according to claim 6, further comprising:
- a test signal generating portion for performing projection of test images generated by changing a brightness component of a video signal to a predetermined state; and
- a self-emitting-light component memory for storing as a self-emitting-light component an illuminance detection value due to reflected light from the screen that is obtained by the projection of the test images,
- wherein the control portion sets the difference values corresponding to the brightness component based on the data stored in the self-emitting-light component memory.

* * * * *